United States Patent
Hasinovic

(10) Patent No.: US 7,503,964 B2
(45) Date of Patent: Mar. 17, 2009

(54) PASTE WAX COMPOSITION

(75) Inventor: Hida Hasinovic, Lexington, KY (US)

(73) Assignee: Ashland Licensing and Intellectual Property, LLC, Dublin, OH (US)

( * ) Notice: Subject to any disclaimer, the term of this patent is extended or adjusted under 35 U.S.C. 154(b) by 0 days.

(21) Appl. No.: 11/879,715

(22) Filed: Jul. 18, 2007

(65) Prior Publication Data

US 2008/0127856 A1   Jun. 5, 2008

Related U.S. Application Data

(60) Provisional application No. 60/858,811, filed on Nov. 14, 2006.

(51) Int. Cl.
*C09G 1/02* (2006.01)
*C09G 1/00* (2006.01)
*C09G 1/08* (2006.01)
*C09G 1/12* (2006.01)
*C09D 191/06* (2006.01)
*C09K 3/00* (2006.01)
*C09K 3/18* (2006.01)

(52) U.S. Cl. .............................. 106/10; 106/3; 106/270; 106/271; 106/272

(58) Field of Classification Search .................... 106/3, 106/10, 270, 271, 272
See application file for complete search history.

(56) References Cited

U.S. PATENT DOCUMENTS

| | | | |
|---|---|---|---|
| 2,907,664 A * | 10/1959 | Schoenholz et al. ........... | 106/10 |
| 2,949,374 A | 8/1960 | Kendall | |
| 3,071,479 A | 1/1963 | Fulenwider, jr. | |
| 3,554,949 A * | 1/1971 | Burke, Jr. ................... | 524/504 |
| 5,094,687 A | 3/1992 | Elepano | |
| 5,141,555 A | 8/1992 | Elepano | |
| 5,198,142 A | 3/1993 | Ehrhart et al. | |
| 5,445,670 A | 8/1995 | Each et al. | |
| 5,782,962 A | 7/1998 | Burke et al. | |
| 6,235,824 B1 | 5/2001 | Vander Louw et al. | |
| 6,258,882 B1 | 7/2001 | Wachowiak, Jr. | |
| 6,387,166 B1 | 5/2002 | Abele et al. | |
| 2001/0045063 A1 | 11/2001 | Kambe et al. | |
| 2004/0242706 A1 | 12/2004 | Wiersema et al. | |
| 2005/0003219 A1 | 1/2005 | Yonei et al. | |
| 2005/0139120 A1 | 6/2005 | Muller et al. | |
| 2005/0155515 A1 | 7/2005 | Jordan et al. | |
| 2006/0025505 A1 | 2/2006 | Hammond | |
| 2006/0110542 A1 | 5/2006 | Dietz et al. | |
| 2007/0129275 A1 * | 6/2007 | Hasinovic et al. ........... | 510/189 |
| 2007/0163463 A1 * | 7/2007 | Hasinovic et al. ............. | 106/10 |
| 2007/0163464 A1 * | 7/2007 | Hasinovic et al. ............. | 106/10 |
| 2007/0209549 A1 * | 9/2007 | Hasinovic et al. ............. | 106/11 |
| 2007/0298992 A1 * | 12/2007 | Hasinovic et al. ........... | 510/189 |

OTHER PUBLICATIONS

PCT-International Search Report and Written Opinion of the International Searching Authority, International Application No. PCT/US 07/23938, mailed Jun. 19, 2008, 11 pp.

* cited by examiner

*Primary Examiner*—Anthony J Green
(74) *Attorney, Agent, or Firm*—Wood Herron & Evans LLP

(57) ABSTRACT

A solvent based paste wax polish composition for metallic, plastic, and painted surfaces containing a blend of synthetic and natural waxes, a blend of silicone fluids, blend of solvents, zinc oxide nanoparticles UV agent having a particle size of 100 nanometers or less, alumina nanoparticles polishing agent having a particle size of 200 nanometers or less, and hydrophobically modified silica nanoparticles of 50 nanometers or less producing a polish having cleaning properties and an enhanced high glossed finish from a single application while exhibiting reduced white dry polish residue during the waxing process.

39 Claims, No Drawings

PASTE WAX COMPOSITION

CROSS REFERENCE TO RELATED APPLICATIONS

This application claims priority from Provisional Application Ser. No. 60/858,811 filed on Nov. 14, 2006 which is incorporated by reference herein in its entirety. Reference to documents made in the specification is intended to result in such patents or literature cited are expressly incorporated herein by reference, including any patents or other literature references cited within such documents as if fully set forth in this specification.

FIELD OF INVENTION

This invention relates to a paste wax composition incorporating ingredients containing nanoparticles designed to provide a smooth surface creating a deeper shine and longer lasting protection than conventional cleaners/polishes by utilizing nanometer sized polishing agent(s) in combination with conventional polishing agents.

BACKGROUND OF INVENTION

Description of the Prior Art

There are numerous polish products available on the market to protect and polish the metallic, plastic, and painted body surfaces of an automobile and also various different ways of applying the same. The most recommended procedure is to wash and dry the metallic surface, apply the protective finish to the clean dry surface, and then buff the surface. The applied polish remains as a protective finish throughout several subsequent washes but it is a time consuming labor intensive procedure.

A quick polish job is obtainable in an automatic or semi-automatic car-wash where a detergent is applied to the surface of the vehicle under high water pressure and/or using a water and detergent solution together with strips of absorbent material or sponges to remove the dirt. As part of the car-wash liquid polish may be sprayed onto the vehicle and allowed to drip dry or be dried using an air blower. The polish compositions used by professional car washes that are applied while the automobile metallized surface is wet are immediately subjected to a blow dry step and are generally not buffed. Neither of the latter two polish procedures provide long lasting satisfactory results.

Conventional commercial polishes typically contain a detergent dispersed in water or dissolved in a solvent, often together with abrasives for dry application to the metal surface of a automobile. The polish dries and is removed with hand or mechanical buffing machines requiring considerable labor and time.

Polishing compounds, especially those defined as cleaner polishes are generally formulated with abrasive materials such as aluminum oxide of larger than 0.20 micrometer particle size. When polishing a car's metallic surface, the cleaner polishes remove contaminants; however, the application and removal of some typically leaves a clean but dull surface. At least a second step of polishing is required with a polishing compound which typically incorporates a high percentage of natural or synthetic waxes and an abrasive material in order to achieve a clean coat of polish having a high gloss appearance.

SUMMARY OF THE INVENTION

A principal object of the present invention is to provide a cleaning and polishing paste wax composition which functions as a cleaner polish to remove dirt and particles of contamination and yet provides a high gloss finish in a single application.

The polishing composition of the present invention is formulated using ingredients containing nanometer sized particles. It is composed with a blend of fine polishing agents and nanoparticles so that it won't damage or scratch the surface of the metal or chrome surface. It can be used on almost all metals, plastic, and paint including chrome, aluminum, stainless steel, brass, copper, gold, silver, and even billet. It can be applied with a sponge applicator or soft towel and removed with a clean soft towel or micro fiber cloth. It can be applied to a surface such as a wheel or body panel in sections or on the whole wheel or vehicle body at once in a quantity sufficient to cover a cleaned surface with a thin film of the product.

The formulated product is a blend of components, some of which are added as emulsified components; however, the formulation is not dependent upon use of an emulsifier in order to disperse all of the various components together in the final product. Conventional polishes typically require an emulsifier to be added to the formulation which acts as a carrier for application to a dry surface.

In keeping with this object there is provided in accordance with the present invention a solvent based paste wax composition for use on vehicular exterior metal, paint, or plastic surface, chrome, stainless steel, plastic chrome moldings, and trim. The cleaning and polishing polish composition contains natural and/or synthetic polishes together with an emulsifying agent and including at least a portion of high purity aluminum oxide having a (nano) particle size of 200 nanometers or less that cleans and provides a high gloss on automobile exterior surfaces upon application to a clean dry surface.

The solvent based paste wax polish composition for metallic, plastic, and painted surfaces contains a blend of synthetic and natural waxes, a blend of silicone fluids, blend of solvents, zinc oxide nanoparticles UV agent having a particle size of 60 nanometers or less, alumina nanoparticles polishing agent having a particle size of 200 nanometers or less, and hydrophobically modified silica nanoparticles of 20 nanometers or less producing a polish having cleaning properties and an enhanced high glossed surface from a single application while exhibiting reduced white dry polish residue during the waxing process. The preferred aluminum oxide is agglomerate free and contains no magnesium oxide. The particle size is a key factor in improving the instant polish composition in that the nano sized ingredients are essentially transparent minimizing swirl marks and filling fine scratches in the surface of the item being waxed.

A preferred embodiment of the present invention comprises a composition utilizes a hydrocarbon solvent in an effective amount of between about 20 to 45 percent by weight of the total composition; a silicone fluid or more preferably a blend of silicone fluids in an effective amount of from about 0.5 to 24 percent by weight based on the total weight of the composition; a natural wax in an amount of between about 1.0 to 20.0 percent by weight based on the total weight of the composition, at least one synthetic wax in an amount of between about 5.0 to 25.0 percent by weight based on the total weight of the composition, at least one synthetic isoparaffinic hydrocarbon in an amount of between about 25.0 to 65.0 percent by weight based on the total weight of the composition, a zinc oxide in an amount of between about 0.01 to 1.0 percent by weight based on the total weight of the composition, an aluminum oxide in an amount of between about 0.1 to 3.0 percent by weight based on the total weight of the composition, and a silica compound in an amount of between about 0.1 to 3.0 percent by weight based on the total weight of the composition. Optionally a fragrance can be added to the formulation.

More particularly, one preferred embodiment consists of a composition utilizes a light, primarily aliphatic, hydrocarbon solvent containing less than 10% aromatic hydrocarbons such as CALUMET 420-460 in an effective amount of between about 20 to 45 percent by weight of the total composition; a silicone fluid or more preferably a blend of silicone fluids having a viscosity ranging from about 100 to 1,000 cst, for instance, the silicone fluid blend may contain 100 cst silicone fluid in an amount of from about 0.5 to 4.0 percent by weight of the total weight of the composition and/or a 350 cst silicone fluid in an amount of from about 0.5 to 4.0 percent by weight of the total weight of the composition and/or a 1,000 cst silicone fluid in an amount of from about 0.5 to 4.0 percent by weight of the total weight of the composition. A preferred embodiment contains a blend of 100 cst, 350 cst, and 1,000 cst silicone fluids in an amount of from about 2.0 to about 18.0 percent by weight of the total weight of the composition; a natural wax such as CARNAUBA #1 in an amount of from between about 1.0 to 10.0 percent by weight based on the total weight of the composition; a blend of synthetic waxes comprising an emulsifiable high melting point oxidized synthetic paraffine such as sold under the trademark PETRONUBA C or ROSSWAX 68-1482, a silicone wax having a siloxane backbone with alkyl groups attached such as sold under the trademark DOW CORNING 2-5088, a paraffin wax having a melting point of about 160-165, a partly saponified ester of montanic acids such as sold under the trademark LICOWAX OP, and an ester of montanic acids such as sold under the trademark of LICOWAX F in an amount of from between about 5.0 to 25.0 percent by weight based on the total weight of the composition, at least one synthetic isoparaffinic hydrocarbon such as sold under the brand name of ISOPAR G in an amount of from between about 25.0 to 65.0 percent by weight based on the total weight of the composition; a zinc oxide powder having a particle size ranging from about 10 to 120 nm and a mean particle size of about 35 nm such as sold under the brand name of ZANO 20 in an amount of from between about 0.01 to 1.0 percent by weight based on the total weight of the composition; an aluminum oxide composed of nanoparticles having a mean particle diameter of about 0.24 microns (240 nanometers) in an amount of from between about 0.1 to 3.0 percent by weight based on the total weight of the composition; and a silica compound such as a hydrophobic fumed silica in an amount of from between about 0.1 to 3.0 percent by weight based on the total weight of the composition. Optionally a fragrance can be added to the formulation.

There is no dye or pigment in the preferred embodiment set forth above, however, other optional components which are not required to provide a functional polishing composition can be added to impart desirable qualities to the composition include a colorant such as a dye or pigment in an effective amount of about 0.001 to 0.05 percent by weight of the total composition; a fragrance such as bubblegum in an effective amount of about 0.35 percent by weight of the total composition; and/or a preservative such as SURCIDE P in an effective amount of about 0.1 percent by weight of the total composition Another preferred embodiment comprises of a composition utilizes a light, primarily aliphatic, hydrocarbon solvent containing less than 10% aromatic hydrocarbons such as CALUMET 420-460 in an effective amount of about 31.3 percent by weight of the total composition; a silicone fluid blend may containing 100 cst silicone fluid in an amount from about 2.0 percent by weight of the total weight of the composition and a 350 cst silicone fluid in an amount of from about 2.0 percent by weight of the total weight of the composition and a 1,000 cst silicone fluid in an amount of from about 2.0 percent by weight of the total weight of the composition; a natural wax such as YELLOW CARNAUBA #1 in an amount of about 6.0 percent by weight based on the total weight of the composition; a blend of synthetic waxes comprising an emulsifiable high melting point oxidized synthetic paraffine such as sold under the trademark PETRONUBA C or ROSSWAX 68-1482 in an amount of about 2.0 percent by weight based on the total weight of the composition, a silicone wax having a siloxane backbone with alkyl groups attached such as sold under the trademark DOW CORNING 2-5088 in an amount of about 2.0 percent by weight based on the total weight of the composition, a paraffin wax having a melting point of about 160-165 in an amount of about 2.0 percent by weight based on the total weight of the composition, a partly saponified ester of montanic acids such as sold under the trademark LICOWAX OP in an amount of about 2.5 percent by weight based on the total weight of the composition, and an ester of montanic acids such as sold under the trademark of LICOWAX F in an amount of about 2.5 percent by weight based on the total weight of the composition; a synthetic isoparaffinic hydrocarbon such as sold under the brand name of ISOPAR G in an amount of about 44.0 percent by weight based on the total weight of the composition; a zinc oxide powder having a particle size ranging from about 10 to 120 nm and a mean particle size of about 35 nm such as sold under the brand name of ZANO in an amount of from between about 0.1 percent by weight based on the total weight of the composition; an aluminum oxide composed of nanoparticles having a mean particle diameter of about 0.24 microns in an amount of about 1.0 percent by weight based on the total weight of the composition; and a silica compound such as a hydrophobic fumed silica in an amount of about 0.25 percent by weight based on the total weight of the composition. Optionally a fragrance can be added to the formulation in an amount of about 0.35 percent by weight based on the total weight of the composition.

DESCRIPTION OF THE PREFERRED EMBODIMENT

The instant invention is particularly directed to reducing the effort of providing a glossy finish on the painted, plastic, or metallic exterior surface of a vehicle such as an automobile or the like by utilizing ingredients containing nanoparticles to impart new and enhanced protective properties to a paste wax applied in a single application. The exterior surface of the automobile is washed in a conventional manner using appropriate conventional cleaning agents such as detergents in the water and the surface is then rinsed using clean water. The surface is dried after rinsing before the wax is applied thereto.

The preferred embodiment of the instant invention comprises a wax composition utilizing a selected amount of blended components and solvent for providing a cleaning action to the vehicle surface and leaving a film/coating of wax which upon buffing yields a high gloss surface.

More particularly, a preferred embodiment consists of a paste wax composition utilizing a light, primarily aliphatic, hydrocarbon solvent containing less than 10% aromatic hydrocarbons such as CALUMET 420-460 in an effective amount of about 31.3 percent by weight of the total composition; a silicone fluid blend may containing 100 cst silicone fluid in an amount of from about 2.0 percent by weight of the total weight of the composition and a 350 cst silicone fluid in an amount of from about 2.0 percent by weight of the total weight of the composition and a 1,000 cst silicone fluid in an amount of from about 2.0 percent by weight of the total weight of the composition; a natural wax such as YELLOW CARNAUBA #1 in an amount of about 6.0 percent by weight based on the total weight of the composition; a blend of synthetic waxes comprising an emulsifiable high melting point oxidized synthetic paraffine such as sold under the trademark PETRONUBA C or ROSSWAX 68-1482 in an amount of about 2.0 percent by weight based on the total weight of the composition, a silicone wax having a siloxane backbone with alkyl groups attached such as sold under the trademark DOW CORNING 2-5088 in an amount of about 2.0 percent by weight based on the total weight of the composition, a paraffin wax having a melting point of about 160-165 in an amount of about 2.0 percent by weight based on the total weight of the composition, a partly saponified ester of montanic acids such as sold under the trademark LICOWAX OP in an amount of about 2.5 percent by weight based on the total weight of the composition, and an ester of montanic acids such as sold under the trademark of LICOWAX F in an amount of about 2.5 percent by weight based on the total weight of the composition; a synthetic isoparaffinic hydrocarbon such as sold under the brand name of ISOPAR G in an amount of about 44.0 percent by weight based on the total weight of the composition; a zinc oxide powder having a particle size ranging from about 10 to 120 nm and a mean particle size of about 35 nm such as sold under the brand name of ZANO in an amount of from between about 0.1 percent by weight based on the total weight of the composition; an aluminum oxide composed of nanoparticles having a mean particle diameter of about 0.24 microns in an amount of about 1.0 percent by weight based on the total weight of the composition; and a silica compound such as a hydrophobic fumed silica in an amount of about 0.25 percent by weight based on the total weight of the composition. Optionally a fragrance can be added to the formulation in an amount of about 0.35 percent by weight based on the total weight of the composition. In addition, a propellant can be added to the formulation to enable the wax to be applied as a spray wax.

A description of the individual ingredients constituting the instant invention is described as follows:

Hydrocarbon Solvents

Organic solvents useful in the present invention include isoparaffins, aliphatic hydrogen solvents, paraffinic solvents, paraffins, synthetic isoparaffinic solvents. They provide cleaning of the waxed surface and control for better film formation and aid in leveling of the waxes. They reduce the tendency of the waxes to gum and minimize swirl marks.

Light Hydrocarbon Distillate

The solvent concentration consisting of light distillate hydrocarbons and isoparaffinic hydrocarbons can vary from about 15% to about 85% by weight of the final formulation.

In addition to being a carrier for the film forming ingredients, the hydrocarbon solvent functions both to remove oil based stains as well as to dissolve polish previously deposited on the surface preventing polish buildup. The hydrocarbon solvent should have an appropriate evaporation rate in order to provide adequate contact time to dissolve old polish on the surface to be treated, but not so slow as to result in smearing and loss of gloss of the deposited film. Moreover, the hydrocarbon solvent aids in cleansing and in the aid of the removal of residual water upon application of the product on a wetted surface.

Light Distillate solvents useful in the formulation are predominately aliphatic hydrocarbon solvents and other light distillates. For instance, hydrocarbons containing up to 100 percent aliphatic hydrocarbons are most preferable and hydrocarbons containing less than 1 percent aromatic content are deemed very desirable. Also useful are solvents typically containing from about 10 to 90 percent aliphatic hydrocarbons and from about 0 to 10 percent aromatic hydrocarbons. Solvents deemed suitable which contain less than 10% aromatic hydrocarbons include odorless mineral spirits, Stoddard solvent, and mixed alkanes that have a flash point of about 40° C. A light distillate sold under the trade name of CALUMET 420-460 (LVP 100), which is utilized at about 31.3 percent by weight of the total composition.

Light Distillate hydrocarbons containing up to 100 percent aliphatic hydrocarbons are most preferable and hydrocarbons containing less than 1 percent aromatic content are deemed very desirable. Also useful are solvents typically containing from about 10 to 90 percent aliphatic hydrocarbons and from about 0 to 10 percent aromatic hydrocarbons. Solvents deemed suitable which contain less than 10% aromatic hydrocarbons include odorless naphtha mineral spirits, turpentine, kerosene, V.M.& P, naphtha, Stoddard solvent, and mixed alkanes that have a flash point of about 40° C.

The present invention contains light distillate hydrocarbons in an effective amount of between 15 to 75 percent by weight, more preferably between 20 to 45 percent by weight, and more preferably 25 to 35 percent by weight based on the weight of the total composition. One preferred embodiment contains a light distillate CALUMET 420-460 an effective amount of about 31.3 percent by weight of the total composition. LPA-170 may also be used instead of CALUMET 420-460 (Information on LPA-170 has been provided).

Isoparaffinic Hydrocarbon High Boiling Organic Solvent

A synthetic isoparaffinic hydrocarbons such as ISOPAR G, ISOPAR M, ISOPAR E, CONOSOL 200, LPA 210, LVP 200, LPA-170 are also useful isoparaffinic hydrocarbon solvents in the present invention.

In addition to the aliphatic hydrocarbon distillate, a preferred embodiment utilizes an isoparaffinic organic solvent added to the wax composition to aid in cleansing and to enhance the evaporation rate of the selected solvent blend.

Preferred organic solvents are sold under the trade name of ISOPAR which are synthetically produced isoparaffinic solvent sold by ExxonMobil Chemical Company which exhibit a low surface tension and also aid in the spreadability of soluble components. The isoparaffinic solvents are highly aliphatic compounds containing a high percentage of isoparaffins. The organic solvents used in the present invention are typically considered high boiling solvents having a low vapor pressure typically less than 1.0 mm Hg at 20° C. and preferably 0.1 mm Hg or less at 20° C. Furthermore, the most preferred ISOPAR solvents reportedly have a vapor pressure of about 10 mm Hg at 38° C. and more preferably have a vapor pressure of about 4 mm Hg at 38° C. The evaporation rate is an important criteria in selection of the organic solvent.

For instance, a preferred ISOPAR solvent is ISOPAR G which has a distillation range for IBP of 163° F. and DP of 176° F., a flash point of 41° C. and evaporation rate of 21 at (N-BuAc=100). A preferred embodiment utilizes ISOPAR G It is also anticipated that white spirits, such as are produced by SHELLSOL (Shell Co. And EXXSOL produced by ExxonMobil Corporation can also be utilized as the solvent.

A preferred embodiment utilizes ISOPAR G as a high boiling organic hydrocarbon solvent from ExxonMobil in an effective amount of from between 15 to 75 percent by weight, more preferably between 30 to 55 percent by weight, and more preferably 35 to 50 percent by weight based on the weight of the total composition. One preferred embodiment contains about 44.0 percent by weight of ISOPAR G based on the total weight of the composition.

Silicone Fluids

One or more silicone fluids such as liquid dimethyl polysiloxanes is used in the present invention to aid in spreading and leveling of the wax components and enhance the gloss of the product upon application. The dimethyl polysiloxane is typically obtained commercially as a silicone oil which is added to the blend of other constituents and mixed together to form the final wax composition. Dimethyl polysiloxane from Dow Corning is sold under the trademark 200 FLUID or from General Electric sold under the trademark SF96 polydimethylsiloxane fluid.

Moreover, polishes use fluids from 50 to 60,000 centistokes viscosity. Lower viscosity fluids provide better leveling and adequate gloss; however, higher viscosity fluids are better for higher gloss, depth of color, and enhanced water beading and hydrophobicity. High viscosity systems are better lubricants for high wax systems. However, high viscosity fluids may exhibit poor rub out and leveling properties, or even bronzing. The high and low viscosity fluids can be blended to optimize the desired characteristics.

General Electric silicone fluid sold under the brand name of SF1706 can be used to extend the durability of the wax and act as a protectant.

As reported in General Electric's formulary guide at www.gesilicones/com/silicones/americas/business/industries/formulary-guide.shtm on February of 2002, these fluids are often characterized as amine functional fluids, however, they are actually curable polymers containing reactive alkoxy groups which upon hydrolyzation convert to silanol (OH) units. The silanol further react to form a cross-linked siloxane linkage (Si—O—Si) on the polish surface. These amine groups increase the bonding properties to the polish surface either through ionic attraction or chemical reaction. The ionic and/or chemical bond insures resistance to detergent wash-off or micro abrasion during use of the polished surface.

One preferred embodiment of the present invention utilizes a blend containing DOW CORNING Silicone Fluid which are medium viscosity polydimethylsiloxane in an amount of up to 18 percent by weight of fluid having a viscosity range of from 100 to 1,000 cst in an amount of from about 0.5 to 40 percent by weight of the total composition. More preferably, the embodiment contains a silicone fluid blend with 100 cst silicone fluid in an amount of from about 0.5 to 40.0 percent by weight of the total weight of the composition and/or a 350 cst silicone fluid in an amount of from about 0.5 to 4.0 percent by weight of the total weight of the composition and/or a 1,000 cst silicone fluid in an amount of from about 0.5 to 4.0 percent by weight of the total weight of the composition. A preferred embodiment contains a blend of 100 cst, 350 cst, and 1,000 cst silicone fluids in an amount of from about 2.0 to about 18.0 percent by weight of the total weight of the composition.

A preferred embodiment as set forth in Example 1 contains a blend of the polydimethylsiloxane wherein the 100 cst is present in an amount of about 2 percent by weight of the total composition and the 350 cst is present in an amount of about 2 percent by weight of the total weight of the total composition and the 1000 cst is present in an amount of about 2 percent by weight of the total composition providing a combined amount of 6 percent by weight of the total weight of the composition in order to impart the desired leveling characteristics for the wax composition.

Natural Wax

The instant invention preferably utilizes at least one natural wax such as carnauba wax and more particularly yellow carnauba wax # 1. Carnauba is the hardest natural wax and has lustrous composition making it the leading choice for food coatings, pharmaceutical coatings and polishes. Number One Grade Carnauba varies from a very pale yellow (white), through a greenish brown (yellow). Carnauba Wax is exuded by the leaves of the Brazilian "Tree of Life" (Copernica Cerifera) to conserve the moisture within the tree and leaves. The wax has a melting point of about 84° C. and congealing point of about 80° C., and saponification value of between 78 and 95 (USP 401). The wax can be obtained from Koster Keunen, Inc. in Watertown, Conn. and typically has a composition of 84-85 percent of alkyl wax acid esters, 3-3.5 free acids, 2-3 percent fatty alcohols, 2-3 percent lactides, 1.5-3 percent of hydrocarbons, and from 4-6 percent alcohol soluble resins based on the total weight of the carnauba wax.

The carnauba wax is added in an effective amount to form a thin film on a surface upon buffing, ranging from 1 to 10.0 percent by weight, and more preferably in a range of from 2 to 8 percent by weight, and more preferably in a range of from between 5 and 7 percent by weight based on the total weight of the composition. One preferred embodiment uses 6 percent by weight of the carnauba wax component.

It is contemplated that alternate natural plant waxes such as candelilla, montan, and/or japan wax could be utilized in the present invention as alternate wax components.

Synthetic Wax

The present invention contains at least one synthetic wax and preferably a blend of synthetic waxes in an amount of from between about 5.0 to 65.0 percent by weight based on the total weight of the composition, more preferably from 5.0 to 30.0 percent by weight based on the total weight of the composition, more preferably from 10.0 to 20.0 percent by weight based on the total weight of the composition, and more preferably from 12.5 to 17.5 percent by weight based on the total weight of the composition. As set forth in Example 1, one preferred embodiment contains 15.0 percent by weight based on the total weight of the composition.

More particularly, the preferred embodiment of the paste wax of the instant invention utilizes a blend of synthetic waxes having a higher melting point and greater hardness than the natural wax. The synthetic wax blend uses one or more of the following ingredients: an emulsifiable high melting point oxidized synthetic paraffin such as sold under the trademark PETRONUBA C or ROSSWAX 68-1482 in an amount of from 0.01 to 15.0 percent and more preferably about 2.0 percent by weight based on the total weight of the composition, a silicone wax having a siloxane backbone with alkyl groups attached such as sold under the trademark DOW CORNING 2-5088 in an amount of about 2.0 percent by weight based on the total weight of the composition, a paraffin wax having a melting point of about 160-165° F. in an amount of about 2.0 percent by weight based on the total weight of the composition, a partly saponified ester of montanic acids such as sold under the trademark LICOWAX OP in an amount of from 0.01 to 15.0 percent and more preferably about 2.5 percent by weight based on the total weight of the composition, and an ester of montanic acids such as sold under the trademark of LICOWAX F in an amount of from 0.01 to 15.0 percent and more preferably about 2.5 percent by weight based on the total weight of the composition.

A commercially available synthetic form of carnauba wax is PETRONUBA C or ROSSWAX available from Baker-Petrolite Corporation which is a white hard, emulsificable high melting point oxidized synthetic paraffine containing long chain acids, esters, alcohols and ketones as some unreacted paraffins. It has good solvent retention properties and is used as a modifying agent to improve stability, hardness, and gloss. It has a gelling point of from 205-215 F (ASTM D127), saponification value of 45-65 (ASTM D1387) and is soluble hot in most all solvents and emulsifiable. The present invention contains up to 15 percent by weight based on the total weight of the composition, more preferably from 0.10 to 10.0 percent by weight based on the total weight of the composition, more preferably from 1.0 to 6.0 percent by weight based on the total weight of the composition, and more preferably from 1.5 to 3.0 percent by weight based on the total weight of the composition. As set forth in Example 1, one preferred embodiment contains 2.0 percent by weight based on the total weight of the composition.

DOW CORNING 2-5088 is an alkyl methyl silicone wax having a siloxane backbone with alkyl groups attached available from the Dow Corning Corporation. It has a melting point of about 70 C and specific gravity at 25 C of 0.800. The present invention contains up to 15 percent by weight based on the total weight of the composition, more preferably from 0.01 to 15.0 percent by weight based on the total weight of the composition, more preferably from 1.0 to 6.0 percent by weight based on the total weight of the composition, and more preferably from 1.5 to 3.0 percent by weight based on the total weight of the composition. As set forth in Example 1, one preferred embodiment contains 2.0 percent by weight based on the total weight of the composition.

A paraffin wax is a synthetic wax which is a hard, white crystalline material derived from petroleum. Paraffin waxes are refined by means of selective solvent processes into different melting point grads having good gloss and resistance to blocking. A preferred paraffin wax selected for the instant composition is Paraffin Wax 160/165 which has a melting point of 162 F, blocking point of 130 and viscosity @210F SUS of 45. The present invention contains up to 15 percent by weight based on the total weight of the composition, more preferably from 0.10 to 10.0 percent by weight based on the total weight of the composition, more preferably from 1.0 to 6.0 percent by weight based on the total weight of the composition, and more preferably from 1.5 to 3.0 percent by weight based on the total weight of the composition. As set forth in Example 1, one preferred embodiment contains 2.0 percent by weight based on the total weight of the composition.

Paraffin waxes are often used due to their cost-effective nature; however, other waxes may be substituted. For example, vegetable and animal waxes may be used. Two preferred waxes, other than paraffin, include soy and coconut waxes. In addition, mixing and substitutions are possible because, although having a different chemical structure, these waxes have similar properties with regard to crystal formation in the solid.

LICOWAX F is an ester wax available from Clariant Corporation. The present invention contains LICOWAX F in an amount up to 15 percent by weight based on the total weight of the composition, more preferably from 0.10 to 10.0 percent by weight based on the total weight of the composition, more preferably from 1.0 to 6.0 percent by weight based on the total weight of the composition, and more preferably from 1.5 to 3.0 percent by weight based on the total weight of the composition. As set forth in Example 1, one preferred embodiment contains 2.5 percent by weight based on the total weight of the composition.

LICOWAX OP is a partially hydrolyzed ester wax and more particularly is a butylene glycol ester of montanic acid that has been partially saponified with calcium hydroxide available from Clariant Corporation. The present invention contains a partially hydrolyzed ester wax in an amount of up to 15 percent by weight based on the total weight of the composition, more preferably from 0.10 to 10.0 percent by weight based on the total weight of the composition, more preferably from 1.0 to 6.0 percent by weight based on the total weight of the composition, and more preferably from 1.5 to 3.0 percent by weight based on the total weight of the composition. As set forth in Example 1, one preferred embodiment contains 2.5 percent by weight based on the total weight of the composition.

Appropriate derivatives of the montanic acids are preferably their esters, amides and salts. It is contemplated that a montanic acid derivative comprising a salt of montanic acid with an alkali metal or alkaline earth metal could be used in the instant invention instead of or in addition to the LICOWAX F or OP. The derivatives of montanic acids are generally prepared by oxidative bleaching of crude montan wax, reaction of the resultant acid wax with an alcohol or amide and/or hydrolysis with an alkali metal hydroxide or alkaline earth metal hydroxide. Examples are ® Licowax S (acid wax), Licowax E and F (ester wax), Licowax OP (partially hydrolyzed ester wax). The material is generally available in flakes.

Polishing Abrasives

Abrasives which can be utilized in the present composition depend upon the nature of the surface to be cleaned and polished. A conventional abrasive could be utilized as an ingredient in the instant formulation to provide a novel paste wax composition; however, the present invention preferably utilizes nanoparticles of one of more polishing abrasives such as aluminum oxide in amounts up to 10.0 percent by weight of the total weight of the composition and preferably from 0.1 to 10.0 percent by weight of the total weight of the composition more preferably from 0.5 to 6.0 percent by weight of the total weight of the composition, more preferably from 1.0 to 3.0 percent of the composition.

One particularly important constituent is the use of nano particles of high purity aluminum oxide preferably having an average particle diameter of about 0.25 microns or micrometers equivalent to 250 nanometers or less that as measured using a Sedigraph 5100-MPD(D50) Sedigraph 5100 obtained from Micromeritics Instrument Corporation. The median particle diameter of the powder is 0.25 microns or 250 nanometers. The particle-size distribution, based on equivalent spherical diameter in microns, is such that about 80 percent of the powder is less than about 0.4 microns and about 20 percent of the powder is less than about 0.2 microns. The distribution can vary but it is preferred that all of the powder be less than 1.0 microns in size, and at least 80% of the powder be no greater than 25 microns in size. More particularly, the present invention utilizes an aluminum oxide preferably having a mean particle size of less than 1.2 microns, more preferably having a mean particle size of less than 1.0 microns, more preferably having a mean particle size of less than 0.8 microns, ore preferably having a mean particle size of less than 0.6 microns, ore preferably having a mean particle size of less than 0.4 microns, more preferably having a mean particle size of less than 0.25 microns, more preferably having a mean particle size of less than 0.20 microns. In one preferred embodiment the particles range in mean particle size up to 0.25 micrometers. The particles are defined as a high purity alumina grade RC-UFX MAR (no Magnesium oxide), and agglomerate free which was available from Reynolds Metals Company and later sold to Baikowski. Because most polishing compounds are generally formulated with aluminum oxide have particles sizes greater than 0.25 micrometers, polishing of a painted surface with same usually leaves a clean but dull surface requiring waxing with a high gloss wax to obtain a glossy surface. Because the instant invention utilizes aluminum oxide having nano particles, enough abrasion is provided to clean the painted surface, yet the nanoparticles do not interfere with the waxes thereby leaving a high gloss wax surface.

The present invention utilizes nanoparticles of aluminum oxide polishing abrasive in amounts up to 10.0 percent by weight of the total weight of the composition and preferably from 0.1 to 10.0 percent by weight of the total weight of the composition more preferably from 0.5 to 6.0 percent by weight of the total weight of the composition, more preferably form 1.0 to 4.0 percent of the composition. As set forth in Example 1, a preferred embodiment uses 1.0 percent by weight of aluminum oxide nanoparticles based on the total weight of the wax paste composition.

The fine polishing abrasives are ground to a size to promote good suspension. The abrasives are insoluble, inert, and non-hydroscopic and will not deteriorate in aqueous or solvent solutions. The abrasive functions as a pigment before and after application to the surface to be treated to produce a white haze visible to indicate presence of the polish and need for removal of same in the polishing procedure. The fine abrasives also smooth the surface being polished by filling in small cracks and crevices, and aids in prohibiting the formation of water spots. The fine abrasives also enhance the ability of the polish to dry rapidly by increasing the surface area of the polishing composition on the treated surface.

Suitable abrasives are selected from the group comprising diatomaceous earth, aluminum silicate, aluminum oxide, silicon dioxide, aluminum dioxide, cerium oxide, zirconium oxide, titanium oxide, manganese dioxide, Fuller's earth, bentonite, silica, micro-crystal silica, talc, pumice tripoli, hydrated calcium silicate, zeolite, anhydrous aluminum silicate, chalk, colloidal clay, magnesium oxide, red iron oxide, and tine oxide all of which should preferably be available in a particle size of less than 5 microns (500 nanometers) or smaller.

UV Protection (Zinc Oxide)

A conventional zinc oxide can be used in the instant formulation to provide UV protection to the instant paste wax composition; however, a preferred embodiment of the present invention utilizes a micro fine transparent nanometer sized zinc oxide powder which offers exceptional and long lasting broad spectrum UV-B/UV-A protection. It is highly effective to protect transparent plastics and plastic films from harmful ultraviolet radiation. Its homogeneous small particles and narrow particle size distribution provides for excellent transparency. It is non-migratory and has antibacterial properties.

Regular commercially available zinc oxides have specific surface areas below 10 $m_2$/gr, (typically 4-6 $m_2$/gr), resulting in high primary particle sizes which results in white particle appearance. The mean particle diameter of the zinc oxide is about 35 nanometers and the majority of the particles range from about 20 to 35 nanometers. One source of the nanometer sized zinc oxide, (ZANO 20) is Umicore Zinc Chemicals in Belguim. The preferred embodiment utilizes zinc oxide particles having a specific surface area of minimum 20 $m_2$/gr, resulting in very fine loosely aggregated particles having a primary particle size below 60 nanometer providing a narrow particle size distribution allowing the zinc oxide to be used in transparent applications. Additional zinc oxide products available from Umicore Zinc Chemicals suitable for use in the present invention is sold under the tradename of ZANO LS and has a specific surface are of 20-30 $m_2$/gr and a primary particle size (calculated) of about 35-55 nanometers; and ZANO HS which has a specific surface are of 30-40 $m_2$/gr and a primary particle size (calculated) of about 25-35 nanometers. The homogeneous particle size distribution of the nanometer sized particle and its fine primary particle size result in good transparency. The nanometer sized zinc oxide particles are broad spectrum UV absorbers (UV-A and UV-B) which is not the case for micro fine TiO2 and organic UV absorbers. It also has anti-bacterial properties and is mildew resistant.

An alternate embodiment utilizes zinc oxide having an average particle size of 60 nanometers (calculated via SSA measurement) sold under the tradename of NANOGARD by Nanophase Technologies Corporation, in Romeoville, Ill. Although it is sold as a white powder, the nanometer sized particles in low concentrations utilized in the preferred embodiments of the instant invention appear transparent.

The zinc oxide in at least one preferred embodiment of the present invention is present in an effective amount of up to 1.0 percent by weight of the total composition. The more preferred embodiments of the invention utilizes an effective amount of glycerin ranging from 0.001 to 1.0 percent by weight, and more preferably in a range of from 0.005 to 0.6 percent by weight, and more preferably in a range of from between 0.01 to 0.4 percent by weight, and more preferably between 0.05 to 0.2 percent by weight based on the total weight of the composition. One preferred embodiment as set forth in Example 1, uses nanoparticles of zinc oxide in an amount of about 0.1 percent by weight based on the total weight of the paste wax composition.

Hydrophobic Surface Modifier

It is believed the instant paste wax composition is a novel combination of synergistic components even without the addition of a hydrophobic fumed silica; however, a preferred embodiment of the present invention contains hydrophobic fumed silica in an effective amount of up to 1.5 percent by weight of the total composition. The more preferred embodiments of the invention utilizes an effective amount of ranging from 0.001 to 3.0 percent by weight, and more preferably in a range of from 0.01 to 1.5 percent by weight, and more preferably in a range of from between 0.1 to 1.0 percent by weight, and more preferably between 0.1 to 0.5 percent by weight based on the total weight of the composition. One preferred embodiment as set forth in Example 1, uses nanoparticles of hydrophobic fumed silica in an amount of about 0.25 percent by weight based on the total weight of the paste wax composition.

Suitable hydrophobically modified fumed silica particles that may be used in the present invention include silica particles that have been hydrophobicized by any means known in the art.

The paste wax composition of the present invention contains a hydrophobic fumed silica such as sold under the trade name of AEROXIDE LE3 to generate self cleaning nano-structured hydrophobic surfaces which repel water. The average particle size distribution of particles is believed to be between 100 to 4,000 nanometers. The LE 3 brand has a specific surface area (BET) of 100+−30 $m^2$g, a carbon content of 3 to 6 weight percent, tapped density of approximately 60 g/l (According to (DIN EN ISO 787/11, August 1983), and a moisture of less than or equal to 1.0 weight percent (2 hours at 105 C).

Several types of hydrophobically modified fumed silica is set forth in U.S. Patent Publication No. US 2006/0110542 by Dietz et al. Published on May 25, 2006 which is incorporated by reference herein and are described as follows:

Colloidal silicon dioxide is generally a fumed silica prepared by a suitable process to reduce the particle size and modify the surface properties. The surface properties are modified to produce fumed silica by production of the silica material under conditions of a vapor-phase hydrolysis at an elevated temperature with a surface modifying silicon compound, such as silicon dimethyl bichloride. Such products are commercially available from a number of sources, including Cabot Corporation, Tuscola, Ill. (under the trade name CAB-O-SIL) and Degussa, Inc., Piscataway, N.J. (under the trade name AEROSIL).

Suitable hydrophobically modified fumed silica particles include, but are not limited to: those commercially available from Degussa Corporation, Parsippany, N.J., as designated under the R Series of the AEROSIL[R] and AEROXIDE[R] LE trade names. The different AEROSIL[R]R and AEROXIDE[R]LE types differ in the kind of hydrophobic coating, the BET surface area, the average primary particle size and the carbon content. The hydrophobic properties are a result of a suitable hydrophobizing treatment, e.g., treatment with at least one compound from the group of the organosilanes, alkylsilanes, the fluorinated silanes, and/or the disilazanes. Commercially available examples include AEROSIL[R]R 202, AEROSIL[R]R 805, AEROSIL[R] R 812, AEROSIL[R]R 812 S, AEROSIL[R] R 972, AEROSIL[R]R 974, AEROSIL[R]R 8200, AEROXIDE[R]LE-1 and AEROXIDE[R] LE-2.

Other silica materials are also suitable when hydrophobically modified by use of hydrophobizing materials capable of rendering the surfaces of the silica particles suitably hydrophobic. The suitable hydrophobizing materials include all those common in the art that are compatible for use with the silica materials to render their surfaces suitably hydrophobic. Suitable examples, include, but are not limited to: the organosilanes, alkylsilanes, the fluorinated silanes, and/or the disilazanes. Suitable organosilanes include, but are not limited to: alkylchlorosilanes; alkoxysilanes, e.g., methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, butyltrimethoxysilane, butyltriethoxysilane, hexyltrimethoxysilane, octyltrimethoxysilane, 3-mercaptopropyltrimethoxysilane, n-octyltriethoxysilane, phenyltriethoxysilane, polytriethoxysilane; trialkoxyarylsilanes; isooctyltrimethoxy-silane; N-(3-triethoxysilylpropyl) methoxyethoxyethoxy ethyl carbamate; N-(3-triethoxysilylpropyl) methoxyethoxyethoxyethyl carbamate; polydialkylsiloxanes including, e.g., polydimethylsiloxane; arylsilanes including, e.g., substituted and unsubstituted arylsilanes; alkylsilanes including, e.g., substituted and unsubstituted alkyl silanes including, e. g., methoxy and hydroxy substituted alkyl silanes; and combinations thereof. Some suitable alkylchlorosilanes include, for example, methyltrichlorosilane, dimethyldichlorosilane, trimethylchlorosilane, octylmethyldichlorosilane, octyltrichlorosilane, octadecylmethyldichlorosilane and octadecyltrichlorosilane. Other suitable materials include, for example, methylmethoxysilanes such as methyltrimethoxysilane, dimethyldimethoxysilane and trimethylmethoxysilane; methylethoxysilanes such as methyltriethoxysilane, dimethyldiethoxysilane and trimethylethoxysilane; methylacetoxysilanes such as methyltriacetoxysilane, dimethyldiacetoxysilane and trimethylacetoxysilane; vinylsilanes such as vinyltrichlorosilane, vinylmethyldichlorosilane, vinyldimethylchlorosilane, vinyltrimethoxysilane, vinylmethyldimethoxysilane, vinyldimethylmethoxysilane, vinyltriethoxysilane, vinylmethyldiethoxysilane and vinyldimethylethoxysilane.

Suitable disilazanes include for example, but are not limited to: hexamethyldisilazane, divinyltetramethyldisilazane and bis(3,3-trifluoropropyl)tetramethyldisilazane. Cyclosilazanes are also suitable, and include, for example, octamethylcyclotetrasilazane. It is noted that the aforementioned disilazanes and cyclosilazanes typically have the basic formula (I) and (II) described above. Thus, these disilazanes and cyclosilazanes can be used as either or both as hydrophobizing material for hydrophobically modifying fumed silica particles and as a processing aid in forming the pre-dispersion mentioned supra.

Suitable fluorinated silanes include the fluorinated alkyl-, alkoxy-, aryl- and/or alkylaryl-silanes, and fully perfluorinated alkyl-, alkoxy-, aryl- and/or alkylaryl-silanes. Examples of fluoroalkyl silanes include, but are not limited to: those marketed by Degussa under the trade name of Dynasylan. An example of a suitable fluorinated alkoxy-silane is perfluorooctyl trimethoxysilane.

Fragrances

Although not required, an effective amount of one or more fragrances, such as vanilla, bubble gum, orange, fruity bouquet and the like may be added to the instant invention to impart a desirable scent to the product. Preferably the fragrance is present in an amount of up to 2 percent by weight, and more preferably of from between 0.001 to 1.0 percent by weight, and more preferably of from between 0.01 to 0.5 percent by weight. One preferred embodiment contains about 0.35 percent by weight of bubblegum fragrance 57733 by Intarome based on the total weight percent of the composition.

Dyes

Dyes, pigments, and/or colorants may also be added to the wax composition in an effective amounts of less than 1 percent by weight based on the total weight of the composition.

Preparation:

The silicone fluids and waxes are blended into the hydrocarbon solvent CALUMET 420-460 and heated at approximately 170 to 185° F. until all of the waxes have dissolved. The hydrophobic fumed silica is blended into the ISOPAR organic solvent until completely dispersed and then the zinc oxide and aluminum oxide are mixed until a good dispersion is obtained at ambient temperature then the mixture is added to the melted waxes at about 160-180° F. The fragrance is added prior to adding the composition to their containers. The hot wax is poured into containers. This filling temperature is approximately 120-140° F. The containers are then placed in a freezer at a temperature of 0-10° F. for approximately ½ hour for better hardness and consistency.

Application:

The polish is applied by rubbing the composition onto a wet or dry metallic, plastic, of painted surface, preferably in a circular motion. After coating the surface, the coated surface is dried until a translucent film is formed thereon, which may be buffed to remove excess polish and leave a uniform, durable, high gloss water resistant protective film thereon.

EXAMPLES

The following examples further describe the polishing compositions of the instant invention, methods of using the polishing compositions, and the tests performed to determine the various characteristics of the polishing compositions. The examples are provided for exemplary purposes to facilitate understanding of the invention and should not be construed to limit the invention to the examples.

Example 1

| Ingredients | Percent by Weight Based on Weight of Total Composition |
|---|---|
| CALUMET 420-460 solvent | 31.3 |
| Silicone Fluid 100 cst | 2.0 |
| Silicone Fluid 350 cst | 2.0 |
| Silicone Fluid 1000 cst | 2.0 |
| Carnauba #1 (natural wax) | 6.0 |
| PETRONUBA C (synthetic wax) | 2.0 |
| DC 2-5088 (synthetic wax) | 2.0 |
| PARAFFIN 160/165 (synthetic wax) | 2.0 |
| LICOWAX F (Synthetic wax) | 2.5 |
| LICOWAX OP (Synthetic wax) | 2.5 |
| ISOPAR G (organic solvent) | 44.0 |
| ZANO 20 (zinc oxide)(mean particle diameter 35 nanometers) | 0.1 |
| RC-UFX MAR (particle size of 200 nm) (median particle diameter 0.24 microns) | 1.0 |
| AEROXIDE LE 3 (hydrophobic fumed silica) | 0.25 |
| Fragrance (Bubble gum) | 0.35 |

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

I claim:

1. A solvent based paste wax polish composition for application to metal, plastic, and painted surfaces, comprising:
   a primarily aliphatic hydrocarbon solvent containing less than 10% aromatic hydrocarbons in an amount of between about 20 to 45 percent by weight based on the total composition;
   at least one silicone fluid having a viscosity ranging from about 100 to 1,000 cst in an amount of from 0.5 to 40 percent by weight of the total composition;
   at least one natural wax in an amount of from between about 1.0 to 20.0 percent by weight based on the total weight of the composition;
   at least one emulsificable oxidized synthetic paraffine in an amount of from 0.1 to 15.0 percent by weight based on the total weight of the composition;
   a silicone wax having a siloxane backbone with alkyl groups attached thereto in an amount of from 0.01 to 15.0 percent by weight based on the total weight of the composition;
   at least one paraffin wax derived from petroleum in an amount of from 0.01 to 15.0 percent by weight based on the total weight of the composition;
   at least one partly saponified ester of montanic acid in an amount of from 0.01 to 15.0 percent by weight based on the total weight of the composition;
   at least one ester of montanic acid in an amount of from 0.01 to 15.0 percent by weight based on the total weight of the composition;
   at least one synthetic isoparaffinic hydrocarbon in an amount of from between about 25.0 to 65.0 percent by weight based on the total weight of the composition;
   a zinc oxide powder in an amount of from between about 0.01 to 1.0 percent by weight based on the total weight of the composition;
   an aluminum oxide in an amount of from between about 0.1 to 10.0 percent by weight based on the total weight of the composition; and
   a hydrophobic surface modifier in an amount of from between about 0.001 to 3.0 percent by weight based on the total weight of the composition.

2. The solvent based paste wax polish composition of claim 1, wherein said at least one silicone fluid comprises from 2.0 to 18.0 percent by weight based on the total weight of the composition.

3. The solvent based paste wax polish composition of claim 1, wherein said at least one silicone fluid comprises a blend of silicone fluids.

4. The solvent based paste wax polish composition of claim 3, wherein said blend of silicone fluids comprises a blend of silicone fluids selected from the group consisting of a 1,000 cst silicone fluid, a 100 cst silicone fluid, and a 350 cst silicone fluid in a combined amount of from about 0.5 to 4.0 percent by weight of the total weight of the composition.

5. The solvent based paste wax polish composition of claim 3, wherein said blend of silicone fluids comprises about 2.0 percent by weight of a 1,000 cst silicone fluid, about 2.0 percent by weight of a 100 cst silicone fluid, and about 2.0 percent by weight of a 350 cst silicone fluid based on the total weight of the composition.

6. The solvent based paste wax polish composition of claim 1, wherein said at least one natural wax comprises a carnauba wax.

7. The solvent based paste wax polish composition of claim 1, wherein said at least one natural wax is present in an amount of from between 1 to 10.0 percent by weight based on the total weight of the composition.

8. The solvent based paste wax polish composition of claim 1, wherein said at least one natural wax is present in an amount of from between 2 to 8.0 percent by weight based on the total weight of the composition.

9. The solvent based paste wax polish composition of claim 1, wherein said at least one natural wax is selected from the group consisting of a carnauba wax, candelilla wax, a montan wax, a japan wax, and combinations thereof.

10. The solvent based paste wax polish composition of claim 1, wherein said aluminum oxide comprises nanoparticles having a mean particle diameter of about 0.24 microns (240 nanometers).

11. The solvent based paste wax polish of composition claim 1, wherein said aluminum oxide comprises nanoparticles having a mean particle diameter of less than 1.2 microns.

12. The solvent based paste wax polish composition of claim 1, wherein said aluminum oxide comprises nanoparticles having a mean particle diameter of from 0.20 to 1.2 microns.

13. The solvent based paste wax polish composition of claim 1, wherein said aluminum oxide is present in an amount of from between about 0.5 to 6.0 percent by weight based on the total weight of the composition.

14. The solvent based paste wax polish composition of claim 1, wherein said aluminum oxide is present in an amount of from between about 1.0 to 4.0 percent by weight based on the total weight of the composition.

15. The solvent based paste wax polish composition of claim 1, wherein said zinc oxide powder comprises a particle size ranging from about 10 to 120 nm.

16. The solvent based paste wax polish composition of claim 1, wherein said zinc oxide powder comprises a mean particle diameter of from 20 to 60 nanometers.

17. The solvent based paste wax polish composition of claim 1, wherein said zinc oxide powder comprises a majority of particles having a size of from 35 to 55 nanometers in diameter.

18. The solvent based paste wax polish composition of claim 1, wherein said hydrophobic surface modifier comprises a silica compound.

19. The solvent based paste wax polish composition of claim 18, wherein said silica compound comprises a hydrophobic fumed silica.

20. The solvent based paste wax polish composition of claim 1, wherein said hydrophobic surface modifier is present in an amount of from between 0.01 to 1.5 percent by weight based on the total weight of the composition.

21. The solvent based paste wax polish compostion of claim 1, wherein said hydrophobic surface modifier is present in an amount of from between 0.1 to 1.0 percent by weight based on the total weight of the composition.

22. The solvent based paste wax polish composition of claim 1, wherein said hydrophobic surface modifier comprises an average particle size distribution of particles between 100 to 4,000 nanometers.

23. The solvent based paste wax polish composition of claim 1, wherein said hydrophobic surface modifier is selected from the group consisting of organosilanes, alkylsilanes, fluorinated silanes, disilazanes, alkylchlorosilanes, alkoxysilanes, methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, butyltrimethoxysilane, butyltriethoxysilane, hexyltrimethoxysilane, octyltrimethoxysilane, 3-mercaptopropyltrimethoxysilane, n-octyltriethoxysilane, phenyltriethoxysilane, polytriethoxysilane, trialkoxyarylsilanes, isooctyltrimethoxysilane, N-(3-triethoxysilylpropyl) methoxyethoxyethoxyethyl carbamate, N-(3-triethoxysilylpropyl) methoxyethoxyethoxyethyl carbamate, polydialkylsiloxanes, polydimethylsiloxane, substituted and unsubstituted arylsilanes, substituted and unsubstituted alkyl silanes, methoxy and hydroxy substituted alkyl silanes, alkylchlorosilanes, methyltrichlorosilane, dimethyldichlorosilane, trimethylchlorosilane, octylmethyldichlorosilane, octyltrichlorosilane, octadecylmethyldichlorosilanes, octadecyltrichlorosilane, methylmethoxysilanes, methyltrimethoxysilane, dimethyldimethoxysilane, trimethylmethoxysilane, methylethoxysilanes, methyltriethoxysilane, dimethyldiethoxysilane, trimethylethoxysilane, methylacetoxysilanes, methyltriacetoxysilane, dimethyldiacetoxysilane, trimethylacetoxysilane, vinylsilanes, vinyltrichlorosilane, vinylmethyldichlorosilane, vinyldimethylchlorosilane, vinyltrimethoxysilane, vinylmethyldimethoxysilane, vinyldimethylmethoxysilane, vinyltriethoxysilane, vinylmethyldiethoxysilane, vinyldimethylethoxysilane, and combinations thereof.

24. The solvent based paste wax polish composition of claim 1, wherein said hydrophobic surface modifier is selected from the group consisting of hexamethyldisilazane, divinyltetramethyldisilazane, bis(3,3-trifluoropropyl)tetramethyldisilazane, and octamethylcyclotetrasilazane.

25. The solvent based paste wax polish composition of claim 1, wherein said hydrophobic surface modifier is selected from the group consisting of fluorinated alkyl-, alkoxy-, aryl- and/or alkylaryl-silanes, and fully perfluorinated alkyl-, alkoxy-, aryl- and/or alkylaryl-silanes.

26. The solvent based paste wax polish composition of claim 1, wherein said hydrophobic surface modifier comprises a fluoroalkyl silane.

27. The solvent based paste wax polish composition of claim 1, wherein said hydrophobic surface modifier comprises a fluorinated alkoxy-silane.

28. A solvent based paste wax polish composition for application to metal, plastic, and painted surfaces, consisting essentially of:
   a primarily aliphatic hydrocarbon solvent containing less than 10% aromatic hydrocarbons in an amount of between about 20 to 45 percent by weight based on the total composition;
   a blend of silicone fluids having a viscosity ranging from about 100 to 1,000 cst in an amount of from 0.5 to 40 percent by weight of the total composition;
   at least one natural wax in an amount of from between about 1.0 to 20.0 percent by weight based on the total weight of the composition;
   at least one synthetic wax in an amount of from 5.0 to 25.0 percent by weight based on the total weight of the composition;
   a silicone wax having a siloxane backbone with alkyl groups attached thereto in an amount of from 0.01 to 15.0 percent by weight based on the total weight of the composition;
   at least one paraffin wax;
   at least one partly saponified ester of montanic acid;
   at least one ester of montanic acid in an amount of from between about 5.0 to 25.0 percent by weight based on the total weight of the composition;
   at least one synthetic isoparaffinic hydrocarbon in an amount of from between about 25.0 to 65.0 percent by weight based on the total weight of the composition;
   a zinc oxide powder having a particle size ranging from about 10 to 120 nm in an amount of from between about 0.01 to 1.0 percent by weight based on the total weight of the composition;
   an abrasive material in an amount of from between about 0.1 to 3.0 percent by weight based on the total weight of the composition; and
   a silica compound comprising a hydrophobic fumed silica in an amount of from between about 0.1 to 3.0 percent by weight based on the total weight of the composition.

29. The solvent based paste wax polish of claim 28, wherein said at least one synthetic wax comprises an emulsifiable oxidized synthetic paraffine.

30. The solvent based paste wax polish of claim 28, wherein said at least one synthetic wax comprises a blend of synthetic waxes.

31. The solvent based paste wax polish of claim 28, wherein said at least one synthetic wax is selected from the group consisting of an emulsifiable oxidized synthetic paraffine, a silicone wax having a siloxane backbone with alkyl groups attached thereto, a paraffin wax having a melting point of about 160-165° F., a partly saponified ester of montanic acid, an ester of montanic acid, and combinations thereof in an amount of from 5 to 15 percent by weight based on the total weight of the composition.

32. The solvent based paste wax polish of claim 28, wherein said at least one synthetic wax is a synthetic form of carnauba wax comprising a white hard, emulsificable oxidized synthetic paraffine containing long chain acids, esters, alcohols and ketones as some unreacted paraffins in an amount of from 5 to 15 percent by weight based on the total weight of the composition.

33. The solvent based paste wax polish of claim 31, wherein said at least one synthetic wax comprises an alkyl methyl silicone wax having a siloxane backbone with alkyl groups attached thereto in an amount of from 5 to 15 percent by weight based on the total weight of the composition.

34. The solvent based paste wax polish of claim 28, wherein said at least one synthetic wax is a derivative of a montanic acid comprising an ester, an amide and its salts.

35. The solvent based paste wax polish of claim 28, wherein said at least one synthetic wax comprises a montanic acid derivative comprising a salt of montanic acid with an alkali metal or alkaline earth metal.

36. The solvent based paste wax polish of claim 28, wherein said abrasive is selected from the group consisting of diatomaceous earth, aluminum silicate, aluminum oxide, silicon dioxide, aluminum dioxide, cerium oxide, zirconium oxide, titanium oxide, manganese dioxide, Fuller's earth, bentonite, silica, micro-crystal silica, talc, pumice tripoli, hydrated calcium silicate, zeolite, anhydrous aluminum silicate, chalk, colloidal clay, magnesium oxide, red iron oxide, and tin oxide.

37. The solvent based paste wax polish of claim 28, wherein said abrasive comprises a particle size of less than 5 microns (500 nanometers) or smaller.

38. A paste wax composition, comprising:
a hydrocarbon solvent comprising at least 90% aliphatic hydrocarbons in an amount of 31.3 percent by weight based on the total weight of the paste wax composition;
a silicone fluid having a viscosity of 100 cst in an amount of 2.0 percent by weight based on the total weight of the paste wax composition;
a silicone fluid having a viscosity of 350 cst in an amount of 2.0 percent by weight based on the total weight of the paste wax composition;
a silicone fluid having a viscosity of 1000 cst in an amount of 2.0 percent by weight based on the total weight of the paste wax composition;
a carnauba wax in an amount of 6.0 percent by weight based on the total weight of the paste wax composition;
a synthetic silicone wax in an amount of 2.0 percent by weight based on the total weight of the paste wax composition;
a synthetic paraffin wax in an amount of 2.0 percent by weight based on the total weight of the paste wax composition;
a synthetic wax consisting essentially of a partly saponified ester of montanic acids in an amount of 2.0 percent by weight based on the total weight of the paste wax composition;
a synthetic wax consisting essentially of an ester of montanic acid in an amount of 2.5 percent by weight based on the total weight of the paste wax composition;
a synthetic isoparaffinic hydrocarbon in an amount of 44.0 percent by weight based on the total weight of the paste wax composition;
a zinc oxide powder comprising nanoparticles having a mean particle diameter of about 35 nanometer in an amount of 0.1 percent by weight based on the total weight of the paste wax composition;
an aluminum oxide powder comprising nanoparticles having a median particle diameter of 0.24 microns in an amount of 1.0 percent by weight based on the total weight of the paste wax composition; and
a hydrophobic fumed silica in an amount of 0.25 percent by weight based on the total weight of the paste wax composition.

39. A solvent based paste wax polish for application to metal, plastic, and painted surfaces, consisting essentially of:
an aliphatic, hydrocarbon solvent containing less than 10% aromatic hydrocarbons;
a silicone fluid blend comprising 100 cst silicone fluid and a 350 cst silicone fluid, and a 1,000 cst silicone fluid;
a natural wax;
a blend of synthetic waxes comprising an emulsifiable oxidized synthetic paraffine;
a silicone wax having a siloxane backbone with alkyl groups attached thereto;
a paraffin wax having a melting point of about 160-165° F.;
a partly saponified ester of a montanic acid;
an ester of at least one montanic acid;
a synthetic isoparaffinic hydrocarbon;
a zinc oxide powder having a particle size ranging from about 10 to 120 nm;
an aluminum oxide composed of nanoparticles having a mean particle diameter of about 0.24 microns; and
a silica compound comprising a hydrophobic fumed silica.

* * * * *

UNITED STATES PATENT AND TRADEMARK OFFICE
CERTIFICATE OF CORRECTION

PATENT NO. : 7,503,964 B2  Page 1 of 2
APPLICATION NO. : 11/879715
DATED : March 17, 2009
INVENTOR(S) : Hida Hasinovic It is certified that error appears in the above-identified patent and that said Letters Patent is hereby corrected as shown below:

Column 1,
Line 11, "are expressly incorporated" should be -- being expressly incorporated --.
Line 51, "provide" should be -- provides --.

Column 2,
Line 57, "composition utilizes a" should be -- composition that utilizes a --.

Column 3,
Line 11, "composition utilizes a" should be -- composition that utilizes a --.

Column 4,
Lines 1-2, "composition utilizes a" should be -- composition that utilizes a --.

Column 5,
Line 4, "containing" should be -- contain --.

Column 6,
Lines 15-17, "A light distillate sold under the trade name of CALUMET 420-460 (LVP 100), which is utilized at about 31.3 percent by weight of the total composition." should be -- A light distillate, which is sold under the trade name of CALUMET 420-460 (LVP 100), is utilized at about 31.3 percent by weight of the total composition. --.
Line 33, "contains... an effective amount" should be -- contains... in an effective amount --.
Line 38, "A synthetic" should be -- Synthetic --.

Column 7,
Lines 45-46, "Fluid which are medium viscosity polydimethylsiloxane" should be -- Fluid, which is a medium viscosity polydimethylsiloxane, --.

Column 9,
Line 3, "emulsificable" should be -- emulsifiable --.
Line 23, "Dow Coming Corporation" should be -- Dow Corning Corporation --.

Signed and Sealed this

Nineteenth Day of October, 2010

David J. Kappos
*Director of the United States Patent and Trademark Office*

Column 10,
Line 46, "or less that as measured" should be -- or less as measured --.
Lines 61-62, "... ore preferably having..., ore preferably having..." should be -- more preferably having..., more preferably having... --.

Column 11,
Line 5, "have particles sizes" should be -- having particle sizes --.
Line 31, "aids" should be -- aid --.
Line 54, "provides" should be -- provide --.

Column 12,
Line 3, "is sold" should be -- are sold --.
Line 4, "surface are" should be -- surface area --.
Line 6, "surface are" should be -- surface area --.
Line 25, "utilizes" should be -- utilize --.
Line 43, "utilizes" should be -- utilize --.
Line 43, "amount of ranging" should be -- amount of hydrophobic formed silica ranging --.

Column 13,
Line 1, "is" should be -- are --.

Column 15,
Line 17, "(synthetic wax" should be -- (synthetic wax) --.
Line 52, "emulsificable" should be -- emulsifiable --.

Column 16,
Lines 18-19, "comprises" should not be indented and should immediately follow "fluid".
Line 51, "of composition" should be -- composition of --.

Column 18,
Lines 44-45, "on" should immediately follow "based" and should not have been carried over to the next line.
Line 65, "emulsificable" should be -- emulsifiable --.

Column 20,
Line 15, "nanometer" should be -- nanometers --.